United States Patent [19]

Yamanaka et al.

[11] Patent Number: 4,506,287

[45] Date of Patent: Mar. 19, 1985

[54] COLOR TELEVISION CAMERA APPARATUS

[75] Inventors: Junichi Yamanaka, Sagamihara; Taizou Nishino, Tokyo, both of Japan

[73] Assignee: Tokyo Shibaura Denki Kabushiki Kaisha, Kawasaki, Japan

[21] Appl. No.: 401,709

[22] Filed: Jul. 26, 1982

[30] Foreign Application Priority Data

Jul. 29, 1981 [JP] Japan .................................. 56-118735

[51] Int. Cl.³ .............................................. H04N 9/535
[52] U.S. Cl. ..................................... 358/21 R; 358/27; 358/28; 358/51
[58] Field of Search ................... 358/21 R, 27, 32, 34, 358/10, 51, 28, 174, 22, 44, 181, 182

[56] References Cited

U.S. PATENT DOCUMENTS 4,314,272  2/1982  Miyaji ..................................... 358/10

Primary Examiner—Richard Murray
Attorney, Agent, or Firm—Cushman, Darby & Cushman

[57] ABSTRACT

A color television camera apparatus having pick-up tubes provided for three primary color components, process amplifiers and an adjustment control circuit for supplying an amount of the adjustment to compensating circuits in the process amplifiers in response to output signals from the process amplifiers. The process amplifiers contain A/D converters connected to the inputs of the amplifiers, respectively. The process amplifiers and the adjustment control circuit digitally process the signals.

6 Claims, 4 Drawing Figures

COLOR TELEVISION CAMERA APPARATUS

BACKGROUND OF THE INVENTION

The present invention relates to a color television camera apparatus of the type in which a video signal level is automatically adjusted.

In a color television camera apparatus, a color image is separated, by an optical system, into three primary color components which in turn are directed to image pick-up tubes. Analog video signals produced from the image pick-up tubes are applied to process amplifiers for various adjustments, respectively. The output signals from the process amplifiers are applied as camera output signals to the next stage circuit, for example, a color coder. The process amplifier includes various adjusting circuits. The amount of adjustment in the adjusting circuit can manually be set at a proper value by a camera man, while seeing a monitor. Recently, such adjustment has automatically been made. For the automatic adjustment, the output signals from the process amplifiers are applied through A/D converters to an adjustment control circuit containing a microcomputer where the adjusting amount is determined. Control signals produced from the adjustment control circuit are supplied to the control terminals of the process amplifiers, through D/A converters.

For distributing the output signal from the process amplifier to a plurality of circuits such as the color coder and the adjustment control circuit, the output signal from the process amplifier is supplied to a distributing circuit. The distributing circuit is comprised of an amplifier with almost a zero output impedance which is supplied with the output signal from the process amplifier and a plurality of output resistors each having one of their ends connected to the output terminal of the amplifier. The other end of each of the output resistors are respectively connected to the color coder and the adjustment control circuit, etc. In fact, the connection is performed through a cable, normally, a coaxial cable. The output resistance of the distributing circuit is set equal to the characteristic impedance 75Ω of the coaxial cable for impedance-matching of the distributing circuit of the coaxial cable. The input terminal of the A/D converter connected to the input of the adjustment control circuit and the input terminal of the color coder are terminated by the termination resistor of 75Ω equal to the characteristic impedance of the coaxial cable. The terminal voltage of the termination resistor is applied as a video signal to the color coder and the adjustment control circuit.

It is necessary that the output resistance of the distributing circuit and the input resistance of the color coder and the adjustment control circuit must accurately coincide with the characteristic impedance of the coaxial cable. Actually, however, it is almost impossible to obtain the accurate coincidence of the impedances. Thus, the connection is always accompanied by a slight amount of impedance mismatching. Therefore, there frequently occurs a difference between the input levels to the color coder and the adjustment control circuit although the same video input signal is applied to them. A difference between the level-down of the transmission cables from the distributing circuit to the color coder and to the adjustment control circuit possibly causes such input level difference between both circuits. This results in inaccuracy of the adjustment. This indicates that in the case of the color cameras, the input level difference is caused for every primary color pick-up tube. Accordingly, it is impossible to obtain a balance among the three colors.

The above discussion has been made using the case of a single camera. Practically, a plurality of television cameras are used when the broadcasting program is processed. In this case, the adjustment must be performed for all the cameras. It is impossible to accurately make the output video levels of the cameras coincident with the input level of a single adjustment control circuit.

In addition to the above problems, the prior art further involves the following problems. The process amplifier performs the analog operations of addition and multiplication. Therefore, it is affected by variations of the ambient temperature and the power voltage. To solve this problem, it is necessary to increase the warm-up time of the camera. More specifically, one to two hours is taken for the warm-up time and then the automatic adjustment is performed. Also after the automatic adjustment, a level drift takes place in the adjusting circuits of the process amplifier, as the result of the analog processing. For cancelling the time varying drift, the automatic adjustment is again needed. The use of the D/A converter leads to the increase of the manufacturing cost, and causes the level drift. Additionally, when the output signal from the process amplifier is distributed to the adjustment control circuit and the color coder and the A/D conversion is performed in the adjustment control circuit, the LSB in the A/D converter is indefinite, resulting in an error of $\pm \frac{1}{2}$ LSB with respect to the video signal to the color coder. As a result, there occurs a difference between the A/D converter video signal applied to the adjustment control circuit and the video signal applied to the color coder.

SUMMARY OF THE INVENTION

Accordingly, an object of the present invention is to provide a color television camera apparatus which can perform an accurate adjustment in a short time and in a simple manner.

To achieve the above object, there is provided a color television camera apparatus comprising an image pick-up section for producing the primary color analog video signals in response to an incident image, an analog to digital converting section for converting an output signal from the image pick-up section into digital signals, a process amplifier section for processing an output signal from the converting section on the basis of adjustment data, and an adjustment control circuit for supplying the adjustment data to the process amplifier section on the basis of an output signal from the process amplifier section.

DETAILED DESCRIPTION OF THE PREFERRED EMBODIMENT

Figure 1:
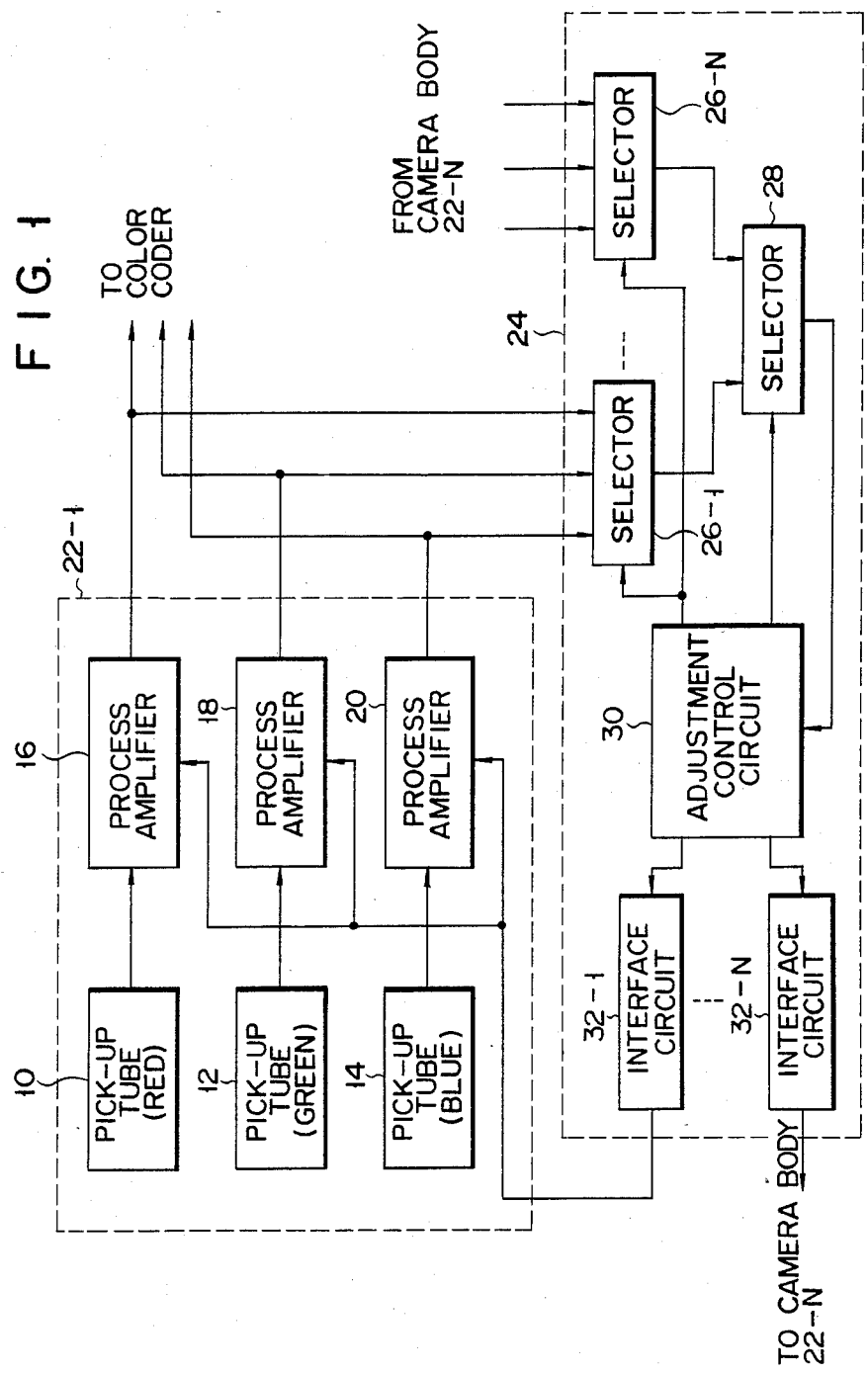
FIG. 1 shows a block diagram of an embodiment of a color television camera apparatus according to the present invention.

An embodiment of a color television camera apparatus according to the preent invention will be described referring to the accompanying drawings. FIG. 1 shows a block diagram showing a circuit arrangement of the embodiment. In the present embodiment, an RGB color separating method is used for picking up a color image. This color separating method may be replaced by another suitable one, for example, a YGB (Y represents a luminous component) color separating method. The incident light containing the image information is separated into three primary colors red, green and blue, by means of an optical system (not shown). The color component lights are applied to pick-up tubes 10, 12 and 14 for red, green and blue, respectively. The output signals from the pick-up tubes 10, 12, and 14 are applied, as the camera output signals, to the next stage circuit, for example, a color coder (not shown) through the respective process amplifiers 16, 18 and 20.

The details of the process amplifiers 16, 18 and 20 will be described later. The pick-up tubes 10, 12 and 14 and the process amplifiers 16, 18 and 20 make up a so called camera body 22-1. The output signals from the process amplifiers 16, 18 and 20 are applied to a selector 26-1 in a control unit 24. The control unit 24 contains N input selectors 26-1 to 26-N allowing the automatic adjustments of N camera bodies. The selectors 26-1 to 26-N each select one from the three primary color components R, G and B. The output signals from the selectors 26-1 to 26-N are applied to an adjustment control circuit 30 through a selector 28. The selector 28 selects one of the output signals coming from the selectors 26-1 to 26-N. The adjustment control circuit 30 is comprised of a microcomputer, etc., as in the prior art. The control signal from the adjustment control circuit 30 is applied to the control terminals of the selectors 26-1 to 26-N and 28. The output signal from the adjustment control circuit 30 is applied to the control terminals of the process amplifiers 16, 18 and 20 in the camera body 22-1 through an interface circuit 32-1. In the present embodiment, the N interface circuits 32-1 to 32-N are used so as to be adaptable for N camera bodies. In FIG. 1, only one camera body is illustrated for simplification of illustration.

Figure 2:
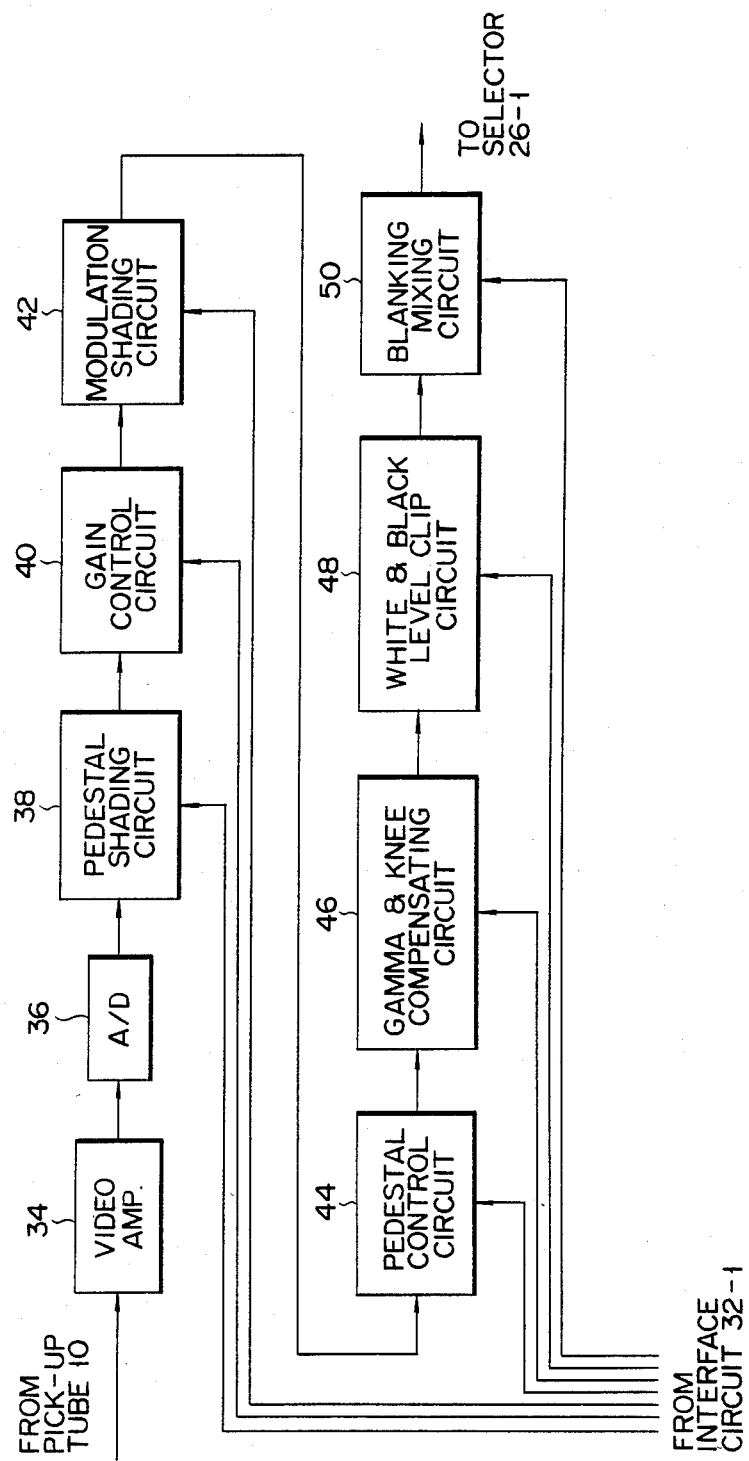
FIG. 2 is a detailed block diagram of the process amplifier used in the embodiment.

FIG. 2 shows a detailed arrangement of the process amplifier 16. The remaining amplifiers 18 and 20 each have the same arrangement as that of FIG. 2 and no explanation of them will be given. A red analog video signal from the pick-up tube 10 is applied to the A/D converter 36 through a video amplifier 34. The output signal from the A/D converter 36 is applied to a pedestal shading circuit 38. The pedestal shading circuit 38 changes a pedestal level dependent on a position on the screen which can be obtained by the horizontal and vertical sync. pulses. The output signal from the pedestal shading circuit 38 is applied to a gain control circuit 40. The gain control of the digital video signal is executed through the multiplying operation of the digital video signal and a digital signal representing an amount of gain control. The output signal from the gain control circuit 40 is applied to a modulation shading circuit 42. The circuit 42 changes the gain dependent on a position on the screen, like the pedestal shading circuit 38. The output signal from the modulation shading circuit 42 is applied to a pedestal control circuit 44. The pedestal control is performed by adding or subtracting a given amount of digital signal to or from the digital video signal. The output signal from the pedestal control circuit 44 is transferred to a gamma and knee compensating circuit 46. The gamma compensation performs a nonlinear operation on the input signal so that $Eo = Ei^\gamma$ (normally $\gamma = 0.45$) where Eo is an output level and Ei is an input level. The knee compensation compresses the white level portion of the video signal. These compensations are made using a memory which stores the data representing these characteristics in the address designated by the input digital signal. An output signal from the gamma and knee compensating circuit 46 is applied to a white and black level clip circuit 48. The circuit 48 applies the input signal to a digital comparator where the signal above the white level or below the black level is removed. The output signal from the white and black level clip circuit 48 is transferred to a blanking mixing circuit 50. This circuit 50 replaces the digital video signal during a blanking period by a certain level digital signal. The output signal from the blanking mixing circuit 50 is transferred as a camera output signal to the selector 26-1 and the color coder. The output signal from the adjustment control circuit 30 is applied to the control terminals of the circuits of 38, 40, 42, 44, 46, 48 and 50 through the interface circuit 32-1.

Figure 3:
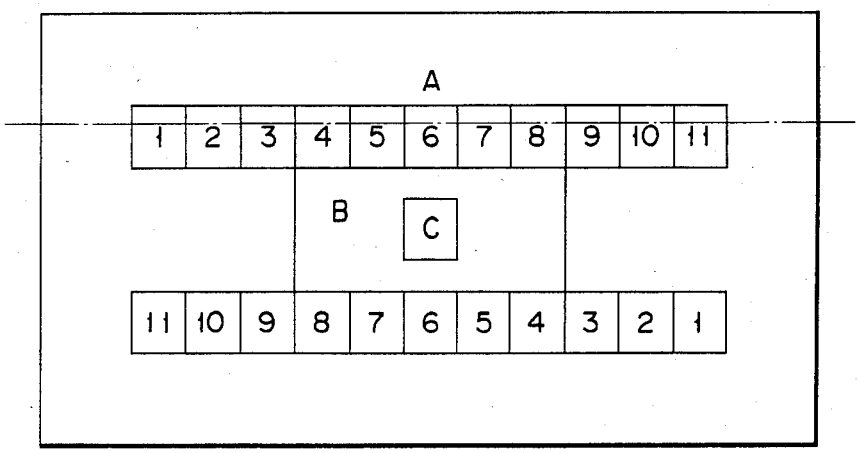
FIG. 3 shows an example of a gray scale chart in use for an automatic adjustment in the embodiment.

The operation of the above-mentioned embodiment will be described. At the time of the adjustment, a gray scale chart as an adjusting chart, as shown in FIG. 3, is picked up. Any type of adjusting chart may be used in the present invention. The present embodiment employs the gray scale to provide for compatibility with the manual adjustment, since the gray scale chart is usually used in the manual adjustment. The reflection factor at the respective locations in the chart is given below:

| Location | 1 | 2 | 3 | 4 | 5 | 6 | 7 |
|---|---|---|---|---|---|---|---|
| Reflection factor (%) | 2.0 | 4.5 | 8.1 | 13.0 | 19.8 | 27.9 | 37.8 |
| Location | 8 | 9 | 10 | 11 | A | B | C |
| Reflection factor (%) | 48.6 | 63.0 | 77.3 | 89.9 | 18.0 | 2.0 | 89.9 |

Figure 4:
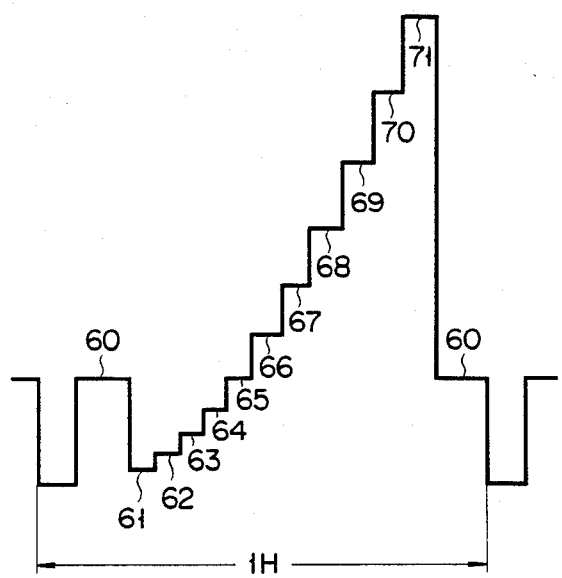
FIG. 4 shows a level diagram of a video signal when the gray scale chart is picked up in the present embodiment.

Usually, the chart is placed in front of the lens and is removed at the time of the general image pick-up. It is evident that the chart may be contained in the lens system and is automatically moved according to the situations of the adjustment and the general image pick-up. A zoom lens is used for the lens. A color separation optical system containing a filter is provided behind the lens, which applies primary color components R, G and B to the pick-up tubes 10, 12 and 14. Analog video signals derived from the pick-up tubes 10, 12 and 14 are applied to an A/D converter 36 through a video amplifier 34. A video signal along one horizontal line, as indicated by a one dot dashed line in FIG. 3, is illustrated in FIG. 4. In the figure, a level denoted as 60 corresponds to a location A in the chart and levels 61 to 71 correspond to the locations 1 to 11 in the chart, respectively. The video amplifier 34 amplifies the video signal to a given level and at the same time makes a frequency compensation. The signal as shown in FIG. 4 is A/D converted and subjected to the various compensations digitally done in the process amplifier. The output signal from the process amplifier, i.e. the output signal from the blanking mixing circuit, is used as a camera output signal to the color coder and a signal for automatic adjustment. The adjustment control circuit 30 determines an amount of adjustment in each adjustment circuit in the process amplifier. Generally, the color signals R and B are subjected to the automatic adjustment on the basis of the G component. The automatic adjustment of the gain and the gamma and flare compensations can be made in a manner that the three levels 61, 66 and 71, for example, of the video signal levels as shown in FIG. 4, when the gray scale chart as shown in FIG. 3 is picked up are subjected to the comparison with the three primary colors. The pedestal control and the pedestal shading are performed while the incident light to the pick-up tubes are shut off. The white level clipping and the knee compensation are performed by increasing the gain of the preceeding stage and opening the diaphragm of the lens.

As described above, in the present embodiment, the analog signal from the pick-up tube is digitized and the digitized video signal is subjected to various level adjustments. The present embodiment with such a feature has various useful advantages. Since the process amplifier produces the digital signal, the input level of the color coder can exactly be coincident with that of the adjustment control circuit, thus ensuring an accurate automatic adjustment. A complete digital processing is employed for the automatic adjustment processing. Such processing can stably be performed free from temperature variation and aging. Further, the warming up of the camera does not take a long time, providing a short time adjustment. In more particular, the automatic adjustment can be started after a short warm up time. After the automatic adjustment, the digital video signal and the digital control signal are subjected to the operation of multiplication or addition/subtraction in the process amplifier. Accordingly, no drift occurs. The automatic adjustment is performed after a short warm up time and therefore automatic readjustment is not required. This feature provides both power and labor savings in using the cameras, increases the life of the camera, and reduces the cost in broadcasting stations.

Since the output signals from the process amplifier is subjected to the A/D conversion before it is distributed to the color coder and the adjustment control circuit, the errors arising from the indefinite LSB equally appear in the video signals in the color coder and the automatic adjusting circuit and therefore cancel each other. Thus, the level difference between the color coder and the adjustment control circuit is eliminated and the error can be reduced to a value which may be produced by the digital processing.

When the present invention is applied to a plurality of camera boides, the above effects are further enhanced, making uniform the picture qualities of the pick-up tubes.

It should be understood that the present invention is not limited to the above-mentioned embodiment but may variously be changed or modified within the scope of the spirit of the present invention. The type of adjustment circuit contained in the process amplifier can be changed according to the situation. For example, a flare compensating circuit, for example, can be contained. A specific adjustment may be performed for one specific color component, not for all the components. Alternately, some compensations may be applied for the camera output signal after the signal to the adjustment control circuit is separated. For example, the white level clip circuit and the blanking mixing circuit may not be contained in the process amplifier, but may be provided at the prestage of the color coder. While the above-mentioned embodiment employs the three-tube type camera, the present invention is applicable for a single tube type camera or a two-tube type camera.

As described above, the present invention provides a color television camera apparatus which can accurately perform an automatic adjustment for a short time by performing the level adjustment after the video analog signal is converted into the digital signal.

What we claim is:

1. A color television camera apparatus, comprising:
   image pick-up means for producing primary-color analog video output signals according to incident light from an object;
   means for converting said output signals from said image-pick-up means into digital output signals;
   process amplifier means for digitally adjusting the digital output signals from said converting means; and
   adjustment control means for supplying digital adjustment data to said process amplifier means in accordance with digital output signals from said process amplifier means, said adjustment data being applied to said process amplifiers to adjust said output signals from said converting means.

2. A color television camera apparatus according to claim 1, in which
   said image pick-up means produce three primary-color component analog signals of Red, Green and Blue respectively, and
   said adjustment control means supplies respective adjustment data for each primary component according to output signals from said converting means representing respectively each of said three primary-color components.

3. A color television camera apparatus according to claim 2, in which
   said adjustment control means produces sequentially adjustment data based on output signals produced from said process amplifier means for each of said primary-color components.

4. A color television camera apparatus according to claim 1, further including
   said object for reflecting incident light received by said image pick-up means, said object being a gray scale chart to provide a known input for adjustment of said apparatus.

5. A color television camera apparatus according to claim 1, in which
   said adjustment control means supplies said adjustment data to other color television camera apparatus.

6. A color television camera apparatus, comprising:
   three image pick-up tubes for respectively producing primary-color analog output signals of Red, Green and Blue according to incident light from an object;
   means for converting respective output signals from said image pick-up tubes into respective digital signals;
   three process amplifiers for producing respective primary-color digital video signals;
   adjustment control means for producing respective adjustment data according to the primary-color digital video signals from said process amplifiers, said adjustment data being applied to said process amplifiers to respectively adjust said output signals from said converting means; and
   means for respectively supplying said adjustment data from said adjustment control means to said process amplifiers.

* * * * *